(12) United States Patent
Tsurumi et al.

(10) Patent No.: US 7,056,253 B2
(45) Date of Patent: Jun. 6, 2006

(54) INTERNAL TEETH OSCILLATING INNER GEARING PLANETARY GEAR SYSTEM

(75) Inventors: Yo Tsurumi, Chiryu (JP); Takashi Haga, Ohbu (JP)

(73) Assignee: Sumitomo Heavy Industries, Ltd., Tokyo (JP)

(*) Notice: Subject to any disclaimer, the term of this patent is extended or adjusted under 35 U.S.C. 154(b) by 19 days.

(21) Appl. No.: 10/803,102

(22) Filed: Mar. 18, 2004

(65) Prior Publication Data

US 2004/0185981 A1    Sep. 23, 2004

(30) Foreign Application Priority Data

Mar. 19, 2003    (JP)    ............................ 2003-075296

(51) Int. Cl.
*F16H 1/32*    (2006.01)

(52) U.S. Cl. ...................... 475/162; 475/179; 475/178; 475/163; 475/162

(58) Field of Classification Search ................ 475/163, 475/168, 176, 177, 178, 179, 162
See application file for complete search history.

(56) References Cited

U.S. PATENT DOCUMENTS 2,488,833 A * 11/1949 Rayard et al. .............. 475/176
5,985,145 A * 11/1999 McEwen .................... 210/295

FOREIGN PATENT DOCUMENTS

JP         2607937        2/1997

* cited by examiner

*Primary Examiner*—Charles A. Marmor
*Assistant Examiner*—Justin K. Holmes
(74) *Attorney, Agent, or Firm*—Squire, Sanders & Dempsey, LLP

(57) ABSTRACT

An internal teeth oscillating inner gearing planetary gear system is provided with an input shaft, an eccentric gear rotated by the input shaft, the internal oscillating body oscillatingly rotated through the inner circumferential surface of the eccentric gear, and an external gear meshed with the internal oscillating body.

1 Claim, 4 Drawing Sheets

INTERNAL TEETH OSCILLATING INNER GEARING PLANETARY GEAR SYSTEM

BACKGROUND OF THE INVENTION

1. Field of the Invention

The present invention relates to an internal teeth oscillating inner gearing planetary gear system.

2. Description of the Related Art

In the art, inner gearing planetary gear systems are employed widely in various reducer fields owing to the advantages of large torque transmission as well as the ability to achieve large reduction ratios.

Among reducers, internal teeth oscillating inner gearing planetary gear systems are known wherein the rotation of an input shaft is reduced in speed and delivered from an output member by oscillatingly rotating internal oscillating bodies around an external gear, the internal oscillating body having a slight difference in the number of teeth with the external gear (for example, Japanese Patent No. 2607937).

An example of the same gear system will be explained with reference to FIGS. 3 and 4.

In the drawings, a casing 1 has a first support block 1A and a second support block 1B joined together by insertion of an engaging member such as a bolt or pin (omitted in drawings) into engaging holes 2. A pinion 6 is disposed on the end of an input shaft 5. The pinion 6 meshes with a plurality of transmitting gears 7 disposed at equal angles around the input shaft 5.

Three eccentric shafts 10 are disposed in the casing 1 at equal-angled intervals (120 degree intervals) circumferentially. The eccentric shafts 10 are supported in a freely rotatable manner by bearings 8 and 9 at both axial ends and have eccentric bodies 10A and 10B in an axially midway portion. The transmitting gears 7 are joined to respective end portions of the eccentric shafts 10. The transmitting gears 7 are rotated by the rotation of the input shaft 5, to rotate each of the eccentric shafts 10.

The eccentric shafts 10 pass through eccentric holes 11A and 11B of two internal oscillating bodies 12A and 12B contained in the casing 1, respectively. Rollers 14A and 14B are disposed between outer circumferences of the two eccentric bodies 10A and 10B adjoined in the axial direction of the eccentric shafts 10 and inner circumferences of the through eccentric holes 11A and 11B of the internal oscillating bodies 12A and 12B, respectively.

An external gear 21 integrated with the end of an output shaft 20 is disposed at the central portion inside the casing 1. Internal teeth 13 formed from pins of the internal oscillating bodies 12A and 12B mesh with external teeth 23 of the external gear 21. A difference in the number of teeth between the external teeth 23 of the external gear 21 and the internal teeth 13 of the internal oscillating bodies 12A and 12B is set to be slight (for example, in a range of about 1 to 4).

The gear system operates in the following manner.

Rotation of the input shaft 5 is delivered to the transmitting gears 7 through the pinion 6. The eccentric shafts 10 are then rotated by the transmitting gears 7. The eccentric bodies 10A and 10B rotate due to rotation of the eccentric shafts 10, then the internal oscillating bodies 12A and 12B oscillatingly rotate due to the rotation of the eccentric bodies 10A and 10B. With this arrangement, through one rotation of the oscillating rotation of the internal oscillating bodies 12A and 12B, a phase of the external gear 21 which meshes with the internal oscillating bodies 12A and 12B is shifted by the difference in the number of teeth. Thus, a rotation component equivalent to the phase difference becomes the (reduction) rotation of the external gear 21, and output of reduced speed is delivered from the output shaft 20.

However, according to this known gear system, since the internal oscillating bodies 12A and 12B are oscillatingly rotated by the three eccentric shafts 10, elements such as the transmitting gears 7 and the rollers 14 must be provided corresponding to the number of the eccentric shafts 10. The number of components is therefore large, and as a result it is difficult to realize cost reduction.

Also, since the single (pinion 6 of the) input shaft 5 rotates the three transmitting gears 7 which are disposed circumferentially at equal intervals, the input shaft 5 must be located in the central portion of the gear system. Thus, for example, it is difficult to form a through-hole in the central portion of a gear system to pass wiring, piping, etc. therethrough.

Moreover, since a single internal oscillating body 12A (12B) is driven by three eccentric shafts 10, it is necessary to fabricate and assemble each member with high accuracy in order to rotate the internal oscillating body 12A (12B) smoothly in a balanced manner.

SUMMARY OF THE INVENTION

The present invention was devised to solve these problems. It is an object to provide an internal teeth oscillating inner gearing planetary gear system in which layout space for piping, wiring, etc. can be easily maintained in the central portion of the system corresponding to particular applications, and in which further smoothness of power transmission can be achieved, while cost reduction by reducing the number of components, reduction of burden of stock, and other effects are made possible.

The present invention provides an internal teeth oscillating inner gearing planetary gear system in which the rotation of an input shaft is reduced in speed and delivered from an output member by oscillatingly rotating an internal oscillating body around an external gear. The internal oscillating body has a slight difference in the number of teeth with the external gear. An eccentric gear rotated by the input shaft has an eccentric inner circumferential surface with respect to its rotational center. The eccentric gear is disposed radially outward of the internal oscillating body. The internal oscillating body is oscillatingly rotated via the inner circumferential surface of the eccentric gear. Thus, the aforementioned problem is solved.

According to the present invention, internal oscillating bodies, which had been oscillatingly rotated by a plurality of eccentric shafts formerly, are oscillatingly rotated by one eccentric gear. Therefore, there is no need to dispose several sliding members such as rollers, transmitting gears, etc., which had to be disposed for each of several eccentric shafts. Thus, the cost is reduced through decreasing the number of components. Particularly, when several capacities, transmission ratios, etc. are to be provided as a group of gear systems, the entire number of stock components can be largely reduced. Moreover, an internal oscillating body can be driven by a single eccentric gear, so that the internal oscillating body can be oscillatingly rotated smoothly in a balanced manner. Thus a further smoothness of power transmission will be possible.

Further, since an eccentric gear is located radially outside the internal oscillating body, an input shaft for driving the eccentric gear does not have to be located in a central portion of a gear system. Accordingly, there is a greater degree of freedom in locating an input shaft. The space in the central portion of the gear system can also be used effectively.

Therefore, the input shaft may be placed radially outside the eccentric gear, for example, in a case where a gear for meshing with a pinion disposed on the input shaft is disposed at an outer circumferential portion of the eccentric gear. With this arrangement, through-space for piping, wiring, etc. can then be easily provided in the central portion of the gear system. Therefore, various examples of the present invention are particularly beneficial in applications such as joint drives in industrial robots. Also, if needed, a desired reduction ratio can be obtained while using the same internal oscillating body and other components by changing the pinion of the input shaft and the gear of the eccentric gear. By changing the pinion diameter and/or the gear diameter, the offset amount of the input shaft with respect to rotational axis of an output-end member (partnered apparatus) can also be optimally designed in response to usage applications, installation location, and other considerations.

Further, if a plurality of the internal oscillating bodies are provided in the axial direction for the same eccentric gear, the plurality of internal oscillating bodies can be simultaneously oscillatingly rotated by the single eccentric gear, and the amount of power transmission can be increased.

Moreover, if the input shaft is placed parallel to the axis of the eccentric gear, and the pinion of the input shaft is placed on an extension in the radial direction of the internal oscillating body, the width dimension of the gear system when viewing the input shaft from the side can be made smaller. Thus, the gear system can be designed smaller.

A construction may also be adopted wherein the input shaft is placed at a right angle to the axis of the eccentric gear, and an orthogonal gear mechanism is formed by the pinion of the input shaft and the gear of the eccentric gear. In this instance, a drive device for driving the gear system can be located in the radial direction of the gear system, to provide compactness of space.

DETAILED DESCRIPTION OF THE PREFERRED EMBODIMENTS

With reference to the drawings, an embodiment of the present invention will be described.

Figure 1:
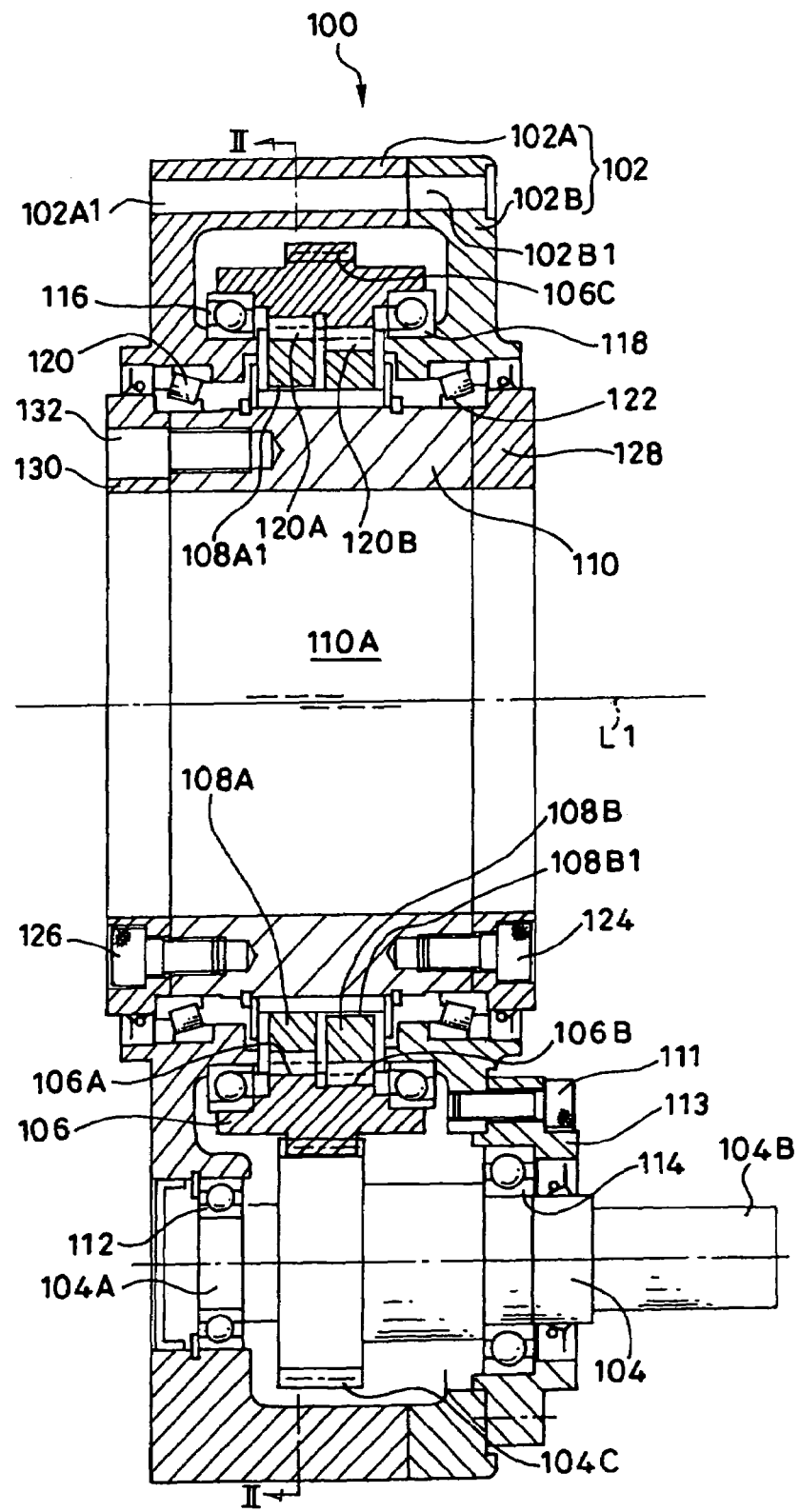
FIG. 1 is a lateral cross-sectional view of an internal teeth oscillating inner gearing planetary gear system according to an embodiment of the present invention.
Figure 2:
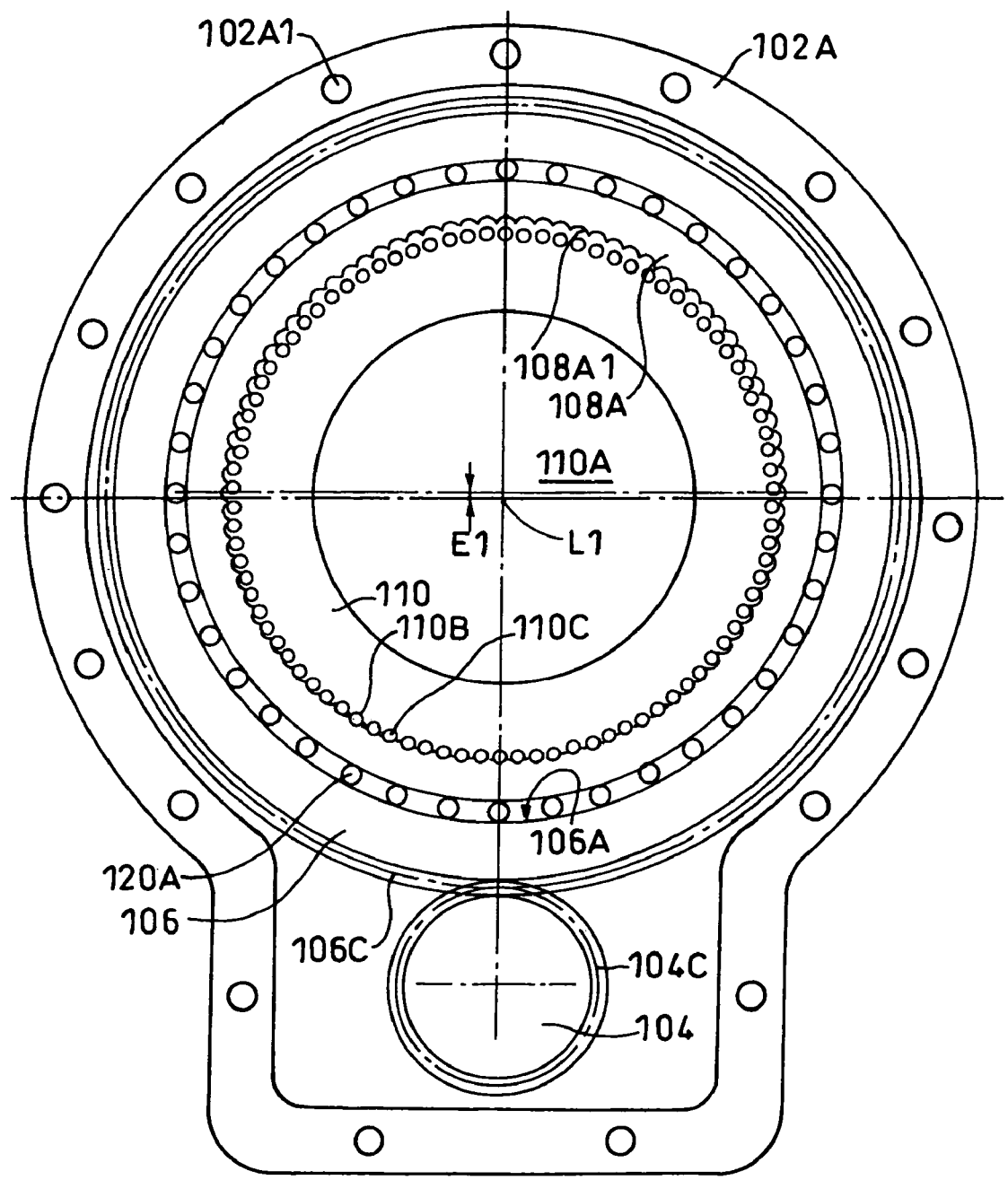
FIG. 2 is a cross-sectional view taken along the line II—II in FIG. 1.
Figure 3:
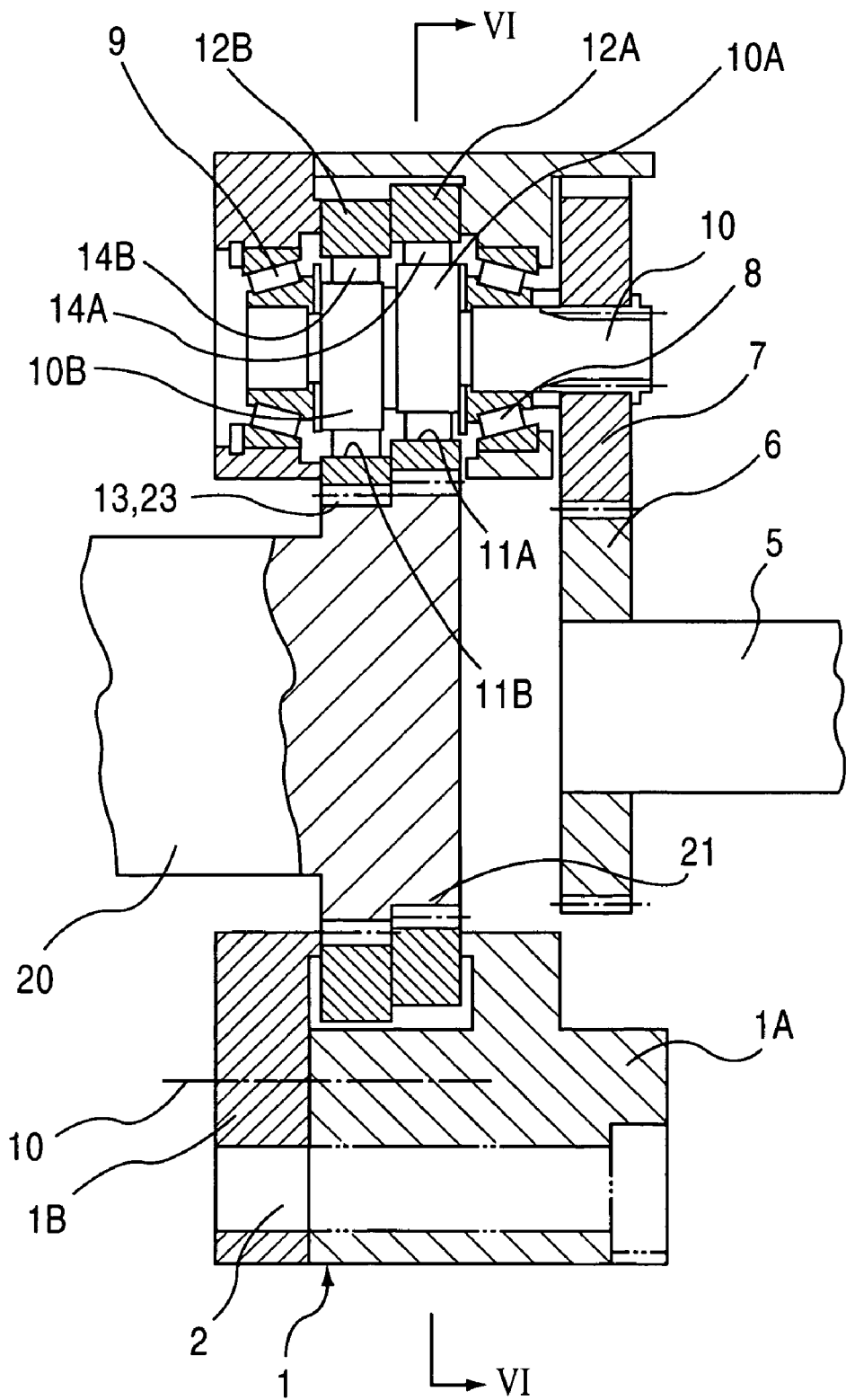
FIG. 3 is a lateral cross-sectional view of an internal teeth oscillating inner gearing planetary gear system of the related art.
Figure 4:
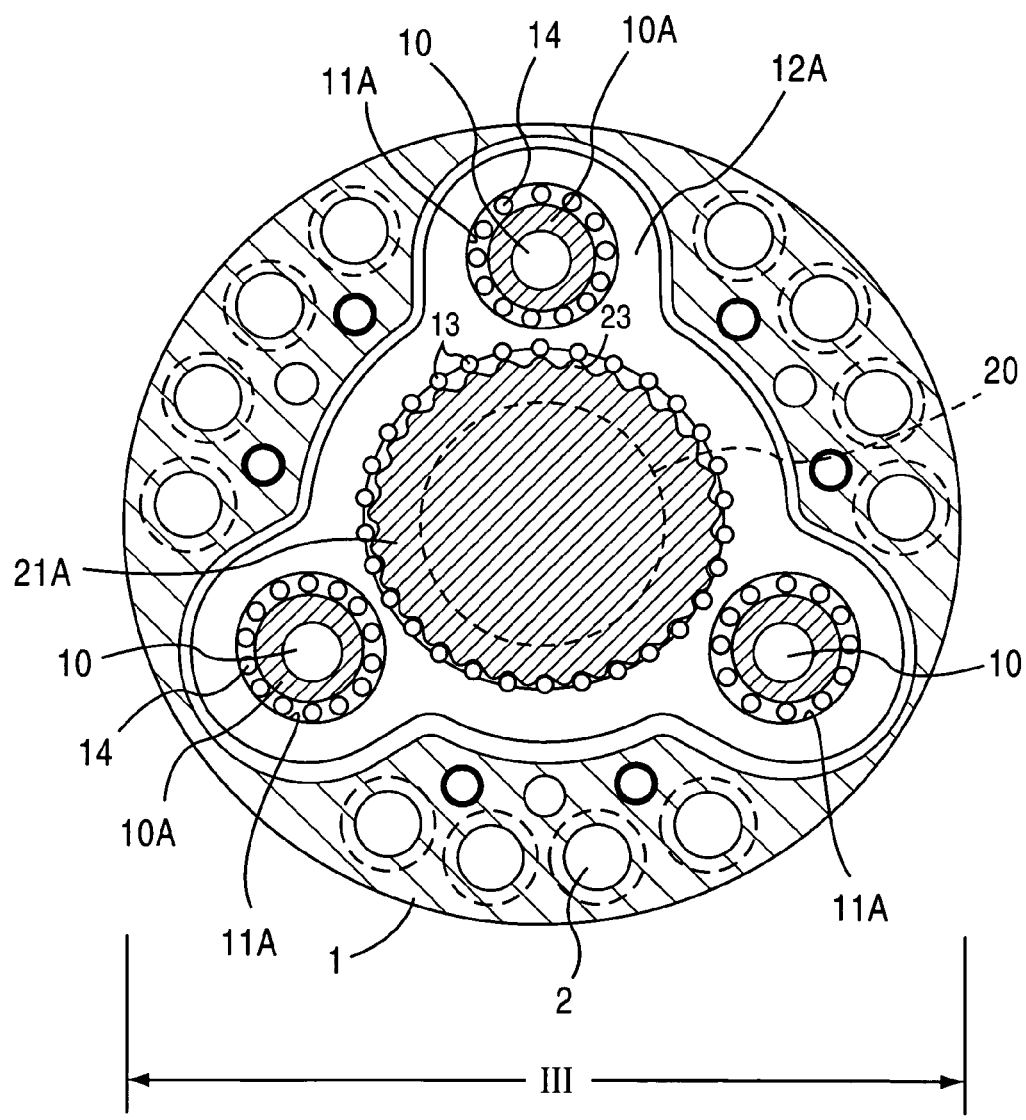
FIG. 4 is a cross-sectional view taken along the line VI—VI in FIG. 3.

FIGS. 1 and 2 are drawings showing an internal teeth oscillating inner gearing planetary gear system 100 (hereafter, simply gear system) according to an embodiment of the present invention. FIG. 1 is a lateral cross-sectional view of the gear system 100, and FIG. 2 is a cross-sectional view taken along the line II—II in FIG. 1.

As shown in the drawings, the gear system 100 mainly comprises a main body casing 102, an input shaft 104, an eccentric gear 106, two internal oscillating bodies 108A and 108B, and an external gear 110 also serving a function as an output shaft.

The main body casing 102 comprises a first casing 102A and a second casing 102B located at the left and right respectively in FIG. 1. A plurality of bolt holes 102A1 and 102B1 are formed respectively in the first casing 102A and the second casing 102B so as to pass therethrough. The first casing 102A and the second casing 102B are mutually joinable by bolts (not shown).

The input shaft 104 is placed sideways in the main body casing 102 in FIG. 1. An end 104A (left of drawing) of the input shaft 104 is rotatably supported by a first bearing 112 disposed in the first casing 102A. Near the center of the input shaft 104, an input shaft cover 113 is attached to the second casing 102B by bolts 111, and the input shaft 104 is rotatably supported in the center vicinity thereof by a second bearing 114 disposed in the input shaft cover 113. Further, another end 104B (right of drawing) of the input shaft 104 extends to project outside the input shaft cover 113, and is connectable with a drive device (not shown) such as a motor. Further, a pinion 104C with a somewhat larger diameter than the axial diameter of the input shaft 104 is disposed at an outer circumferential portion of the input shaft 104 between the first bearing 112 and the second bearing 114, and the input shaft 104 meshes with the eccentric gear 106 through the pinion 104C.

The eccentric gear 106 is made up of a substantially ring-shaped member located radially outside the input shaft 104, and is supported to be rotatable by a third bearing 116 disposed in the first casing 102A and by a fourth bearing 118 disposed in the second casing 102B. A gear 106C is formed at an outer circumferential portion of the eccentric gear 106, and is meshable with the pinion 104C of the input shaft 104.

As shown in FIG. 2, a first inner circumferential surface 106A processed to be eccentric by an amount E1 with respect to a rotational center L1 of the eccentric gear 106, and a second inner circumferential surface 106B (shown only in FIG. 1) processed to be eccentric with a 180 degree phase difference relative to the first inner circumferential surface 106A, are formed at an inner circumferential portion of the eccentric gear 106. The two internal oscillating bodies 108A and 108B are respectively located further inside the inner circumference of the inner circumferential surfaces 106A and 106B through rollers 120A and 120B.

The internal oscillating bodies 108A and 108B are made up of substantially ring-shaped members having somewhat smaller diameters than the eccentric gear 106, and a plurality of internal teeth 108A1 and 108B1 having a trochoid tooth profile are formed on inner circumferences thereof. Further, the previously discussed pinion 104C of the input shaft 104 is located to be on an extension in the radial direction of the internal oscillating bodies 108A and 108B. "Located to be on an extension in the radial direction" here means that an axial positioning of the internal oscillating bodies 108A and 108B and an axial positioning of the pinion 104C are mutually overlapped at least partially in the radial direction. Further, the external gear 110 which meshes with the internal oscillating bodies 108A and 108B is located further inside the inner circumference of the internal oscillating bodies 108A and 108B.

The external gear 110 is made up of a substantially tubular member having a through-hole 110A through which piping, wiring, etc. can pass. A portion of the outer circumference of the external gear 110 is structured such that external pins 110C are fitted to be freely rotatable in plurally formed circular grooves 110B. The plurality of external pins 110C form external teeth of the external gear 110 meshable with the internal teeth 108A1 and 108B1 of the internal oscillating bodies 108A and 108B. Further, the external gear 110 is rotatably supported by two bearings 120 and 122 disposed inside the first casing 102A and the second casing 102B respectively. The bearings 120 and 122 are kept from moving axially by flanges 128 and 130 secured by bolts 124 and 126 at both ends. Finally, an output-end member (partnered apparatus)(not shown) is joined through bolt holes 132 formed in the flange 130, so that rotational output of the external gear 110 is delivered to outside.

Next, operation of the gear system 100 according to the embodiment of the present invention will be described.

Rotation inputted to the input shaft 104 is transmitted to the eccentric gear 106 through the pinion 104C of the input shaft 104 and the gear 106C of the eccentric gear 106 which meshes therewith. Upon rotation of the eccentric gear 106, the two internal oscillating bodies 108A and 108B are guided by the inner circumferential surfaces 106A and 106B respectively of the eccentric gear 106 and are oscillatingly rotated. Owing to this arrangement, through one oscillating rotation of the internal oscillating bodies 108A and 108B, the external gear 110 meshing with the internal oscillating bodies 108A and 108B becomes out of phase according to the difference in the number of teeth thereof. A rotational component equivalent to the phase difference thereof thus makes the rotation of the external gear 110, and output is delivered to outside.

According to the gear system 100 in accordance with the present embodiment of the invention, the internal oscillating bodies 108A and 108B, which had been oscillatingly rotated conventionally by a plurality of eccentric shafts, can be oscillatingly rotated by the single eccentric gear 106. Therefore, it is unnecessary to provide a plurality of sliding members such as rollers, transmitting gears, etc. which had to be provided for each of a plurality of eccentric shafts. Cost reductoin is then enabled owing to a reduction in the number of components. Particularly when a plurality of capacities, transmission ratios, etc. are to be provided as a product group for the gear systems 100, the total number of stock components can be largely reduced. In addition, the internal oscillating bodies 108A (108B) can be oscillatingly rotated in a smooth and balanced manner and further smoothness of power transmission can be achieved by driving the internal oscillating bodies 108A (108B) by the single eccentric gear 106.

Also, since the eccentric gear 106 is located radially outside the internal oscillating bodies 108A and 108B, the input shaft 104 for driving the eccentric gear 106 does not necessarily have to be located in the center portion of the gear system 100. Therefore, the degree of freedom in locating the input shaft 104 is increased so that a space in the center portion of the gear system 100 can be used effectively.

Specifically, since the gear 106C is disposed at the outer circumferential portion of the eccentric gear 106 to mesh with the pinion 104C disposed on the input shaft 104 and the input shaft 104 is located radially outside the eccentric gear 106, the through-hole 110A through which piping, wiring, etc. pass can be provided in the external gear 110 located at the central portion of the gear system 100. Therefore, the present invention is particularly useful in applications such as joint drive in industrial robots, for example. Further, by changing the pinion 104C of the input shaft 104 and the gear 106C of the eccentric gear 106, a desired reduction ratio can be achieved while using the same internal oscillating bodies 108A and 108B and other structural elements. Also, by varying the radial dimensions of the pinion 104C, the gear 106C, etc., the amount of offset of the input shaft 104 with respect to the rotational center of an output-end member (mating apparatus) can be optimally designed according to intended usage, location of installation, and other factors. Further, since the input shaft 104 is located parallel to the axis L1 of the eccentric gear 106, and since the pinion 104C of the input shaft 104 is located to be on an extension in the radial direction of the internal oscillating bodies 108A and 108B, the width dimension (axial dimension) of the gear system 100 when viewing the input shaft 104 from the side can be made smaller, and a more compact design of the gear system 100 can be provided.

Further, since the two internal oscillating bodies 108A and 108B are provided for the same eccentric gear 106, the plurality of internal oscillating bodies 108A and 108B can be oscillatingly rotated simultaneously by the single eccentric gear 106. An increase in the amount of power to be transmitted can thus be achieved. Further, the present invention is not limited in this manner, and may be a gear system comprising only one internal oscillating body, or may be a gear system comprising three or more.

Also according to the aforementioned embodiment, the internal teeth 108A1 and 108B1 of the internal oscillating bodies 108A and 108B have trochoid tooth profiles, and the external teeth 110C of the external gear 110 have a circular tooth profile, however, the present invention is not limited in this manner. For example, the internal teeth of the internal oscillating bodies may have circular tooth profiles while the external teeth of the external gear have a trochoid tooth profile, or both may have involute tooth profiles, etc.

Further, according to the aforementioned embodiment, the input shaft 104 is located parallel to the axis L1 of the eccentric gear 106, however, the present invention is not limited in this manner. The input shaft may be located at a right angle to the axis of the eccentric gear, yielding a structure wherein an orthogonal gear mechanism (hypoid gears, bevel gears) is formed by the pinion of the input shaft and the gear of the eccentric gear. With such an arrangement, a drive device such as a motor for driving the gear system can be located radially relative to the gear system, and less space can be occupied.

According to the present invention, an internal teeth oscillating inner gearing planetary gear system can be provided which can easily maintain layout space for piping, wiring, etc. in the central portion of the system according to particular applications, and which can achieve further smoothness of power transmission, while cost reduction through reduction of the number of components, reduction of stock burden, and other effects can be realized.

The disclosure of Japanese Patent Application No. 2003-75296 filed Mar. 19, 2003 including specification, drawings claims is incorporated herein by reference in its entirety.

What is claimed is:

1. An internal teeth oscillating inner gearing planetary gear system comprising:
    an input shaft;
    an eccentric gear being rotated by the input shaft and having an eccentric inner circumferential surface with respect to a rotational center thereof;
    an internal oscillating body being guided by the inner circumferential surface of the eccentric gear and oscillatingly moved thereby, the internal oscillating body having internal teeth on an inner periphery thereof;
    an external gear internally meshing with the internal oscillating body, the external gear having slightly less number of external teeth than that of the internal teeth of the internal oscillating body, wherein a plurality of the internal oscillating bodies are provided in an axial direction with respect to the same eccentric gear.

* * * * *